United States Patent
Hayashi et al.

(10) Patent No.: US 9,424,996 B2
(45) Date of Patent: Aug. 23, 2016

(54) ELECTRODE ACTIVE MATERIAL, ELECTRODE AND ELECTRICAL STORAGE DEVICE

(71) Applicants: JSR CORPORATION, Minato-ku (JP); JM ENERGY CORPORATION, Hokuto-shi (JP)

(72) Inventors: Toshihiro Hayashi, Hokuto (JP); Tomohiro Utaka, Hokuto (JP)

(73) Assignees: JSR CORPORATION, Minato-ku (JP); JM ENERGY CORPORATION, Hokuto-shi (JP)

( * ) Notice: Subject to any disclaimer, the term of this patent is extended or adjusted under 35 U.S.C. 154(b) by 349 days.

(21) Appl. No.: 13/871,373

(22) Filed: Apr. 26, 2013

(65) Prior Publication Data

US 2013/0309577 A1    Nov. 21, 2013

(30) Foreign Application Priority Data

May 18, 2012   (JP) ................. 2012-114816

(51) Int. Cl.
| | | |
|---|---|---|
| *H01M 4/133* | (2010.01) | |
| *H01G 9/048* | (2006.01) | |
| *H01M 4/36* | (2006.01) | |
| *H01M 4/583* | (2010.01) | |
| *H01G 11/24* | (2013.01) | |
| *H01G 11/34* | (2013.01) | |
| *H01G 11/42* | (2013.01) | |
| *H01G 11/50* | (2013.01) | |
| *B82Y 99/00* | (2011.01) | |

(52) U.S. Cl.
CPC .............. *H01G 9/048* (2013.01); *H01G 11/24* (2013.01); *H01G 11/34* (2013.01); *H01G 11/42* (2013.01); *H01M 4/133* (2013.01); *H01M 4/366* (2013.01); *H01M 4/583* (2013.01); *B82Y 99/00* (2013.01); *H01G 11/50* (2013.01); *Y02E 60/13* (2013.01); *Y10S 977/948* (2013.01)

(58) Field of Classification Search
CPC ........................... H01M 4/133; H01M 4/366
USPC ..................................................... 429/231.8
See application file for complete search history.

(56) References Cited

U.S. PATENT DOCUMENTS

| | | | |
|---|---|---|---|
| 6,461,769 B1 | 10/2002 | Ando et al. | |
| 6,740,454 B1 | 5/2004 | Ando et al. | |
| 8,142,930 B2 | 3/2012 | Kojima et al. | |
| 2008/0220329 A1* | 9/2008 | Kojima et al. | 429/188 |
| 2009/0196816 A1* | 8/2009 | Yamamoto et al. | 423/448 |
| 2010/0099031 A1* | 4/2010 | Kato et al. | 429/330 |
| 2011/0200874 A1* | 8/2011 | Ono | H01M 4/134 429/213 |

FOREIGN PATENT DOCUMENTS

| | | |
|---|---|---|
| DE | 10 2010 005 954 A1 | 7/2011 |
| EP | 1 939 971 A1 | 7/2008 |
| EP | 2 682 966 A1 | 1/2014 |
| JP | 2000-348726 A | 12/2000 |
| JP | 2004-221523 | 8/2004 |
| JP | 2005-239450 | 9/2005 |
| JP | 2007-39290 A | 2/2007 |
| JP | 2008-166156 | 7/2008 |
| JP | 2009-246137 A | 10/2009 |
| JP | 2010-135648 A | 6/2010 |
| JP | 2012-4142 A | 1/2012 |
| WO | WO 98/33227 A1 | 7/1998 |
| WO | WO 00/07255 A1 | 2/2000 |
| WO | WO 02/43088 A2 | 5/2002 |
| WO | WO 02/43088 A3 | 5/2002 |
| WO | WO 2006/118120 A1 | 11/2006 |

OTHER PUBLICATIONS

Extended European Search Report issued Apr. 1, 2014 in Patent Application No. 13166742.0.
Material Science Basics, vol. 5, Method of Measuring Nanoparticles (Particle Size Distribution, Specific Surface Area), Sigma-Aldrich Co., 2011.
Japanese Office Action issued May 9, 2016, in Japanese Patent Application No. 2013-038715.

* cited by examiner

*Primary Examiner* — Basia Ridley
*Assistant Examiner* — James Erwin
(74) *Attorney, Agent, or Firm* — Oblon, McClelland, Maier & Neustadt, L.L.P.

(57) ABSTRACT

The electrode active material includes a carbon material having a volume of macropores with 50 to 400 nm pore diameters of 0.05 to 0.40 cc/g. The carbon material may be a composite carbon material that contains a carbon material forming a core, and a coating carbon material covering at least part of the core-forming carbon material.

10 Claims, No Drawings

ELECTRODE ACTIVE MATERIAL, ELECTRODE AND ELECTRICAL STORAGE DEVICE

TECHNICAL FIELD

The present invention relates to electrode active materials, electrodes and electrical storage devices. More particularly, the invention relates to electrode active materials suitably used in devices such as electrical storage devices including lithium ion secondary batteries and lithium ion capacitors, to electrodes containing the electrode active materials, and to electrical storage devices having the electrode as a negative electrode.

BACKGROUND ART

Remarkable progress has occurred recently in miniaturization and weight reduction of electronic devices. Consequently, greater demands have been placed on the reduction of size and weight of batteries used as power supplies for driving such electronic devices. To meet such demands for miniaturization and weight reduction, nonaqueous electrolyte secondary batteries represented by lithium ion secondary batteries have been developed as electrical storage devices. Further, electric double layer capacitors are known as electrical storage devices exhibiting excellent characteristics such as high output density and good cycle performance. Furthermore, attentions have been drawn to lithium ion capacitors based on a combination of electrical storage principles of lithium ion secondary batteries and electric double layer capacitors. Lithium ion capacitors are electrical storage devices that comply with applications requiring high energy density characteristics and high output characteristics.

Various studies have been carried out on negative electrode materials used in such electrical storage devices. For example, Patent Literature 1 discloses that an electrical storage device with high energy, high output and excellent low-temperature characteristics is obtained by controlling the mesopore volume of a carbon material used as a negative electrode active material. Further, Patent Literature 2 discloses that a nonaqueous secondary battery with high resistance to the decomposition of electrolytic solution and excellent charge/discharge efficiency is obtained by using carbon powder as a negative electrode material which has a ratio V2/V1 of not less than 1 wherein V1 is the volume of pores with pore diameters of 2 to 50 nm and V2 is the volume of pores with pore diameters of 50 to 200 nm.

CITATION LIST

Patent Literature

Patent Literature 1: WO 2006/118120
Patent Literature 2: JP-A-2007-39290

SUMMARY OF THE INVENTION

Technical Problem

However, electrical storage devices utilizing these conventional active materials are still incapable of realizing excellent characteristics, especially at low temperatures.

It is therefore an object of the present invention to provide an electrode active material which allows an electrical storage device to exhibit excellent characteristics at low temperatures.

Solution to Problem

The present inventors carried out studies in view of the above circumstances. As a result, the present inventors have found that the above problems can be solved by using carbon materials having a larger macropore volume than the conventional level. The present invention has been completed based on the finding.

The invention provides an electrode active material which includes a carbon material having a volume of macropores with 50 to 400 nm pore diameters of 0.05 to 0.40 cc/g (hereinafter, also referred to as "inventive carbon material").

The invention also provides an electrode containing the above electrode active material. Further, the invention provides an electrical storage device having the electrode as a negative electrode.

Advantageous Effects of Invention

The inventive electrode active materials allow electrical storage devices to exhibit low internal resistance at low temperatures and achieve excellent cycle characteristics. Thus, the electrode active materials of the invention are highly useful as electrode materials for electrical storage devices such as lithium ion capacitors and lithium ion secondary batteries.

DESCRIPTION OF THE EMBODIMENTS

The present invention will be described in detail hereinbelow.

Electrode Active Materials

An electrode active material of the invention includes an inventive carbon material, namely, a carbon material having a volume of macropores with 50 to 400 nm pore diameters (hereinafter, also referred to as "macropore volume") of 0.05 to 0.40 cc/g. In the invention, the macropore volume indicates a volume of pores with 50 to 400 nm pore diameters according to DH analysis with respect to a nitrogen adsorption isotherm obtained by a nitrogen adsorption method at 77 K with automatic specific surface area/pore size distribution analyzer BELSORP-mini II manufactured by BEL Japan, Inc.

The macropore volume of the inventive carbon material is preferably 0.05 to 0.35 cc/g, and particularly preferably 0.06 to 0.30 cc/g. If the macropore volume is less than 0.05 cc/g, the desired effects may not be obtained. Macropore volume in excess of 0.40 cc/g may lead to a decrease in electrode strength, difficulties for an electrode slurry to exhibit fluidity, and deteriorations in cycle characteristics.

The 50% volume cumulative diameter D50 of the inventive carbon material is preferably 1.0 to 10.0 μm, and particularly preferably 1.0 to 5.0 μm. If the 50% volume cumulative diameter D50 is too small, cycle characteristics may be deteriorated, charge/discharge efficiency may be lowered, and energy density may be decreased due to low bulk density of the active material layer. If the 50% volume cumulative diameter D50 is excessively large, the internal resistance of electrical storage devices may be increased. The 50% volume cumulative diameter D50 (median diameter) is measured by a laser diffraction/scattering method.

The specific surface area of the inventive carbon material is preferably 0.01 to 50 m$^2$/g, and particularly preferably 3 to 30 m$^2$/g. If the specific surface area is too small, excessive coating may result and internal resistance may be increased. If the specific surface area is excessively large, electrode strength may be insufficient.

The inventive carbon material may be produced by an appropriate method. Preferably, the inventive carbon material is produced by mixing and/or kneading carbon material particles having a macropore volume greater than 0.05 cc/g together with an organic compound to coat the particles by the organic compound, and thereafter carbonizing the coated particles by calcination at 500 to 1500° C. in the presence of an inert gas. That is, the inventive carbon material is preferably a composite carbon material that contains a carbon material forming the core and a coating carbon material which covers at least part of the core-forming carbon material. (Hereinafter, this inventive carbon material is also referred to as "composite carbon material"). The inventive carbon material may be selected from commercial carbon materials such as natural graphites, artificial graphites, graphitizable carbons, graphite-like materials from graphitizable carbons, and powders of carbon fibers provided that such carbon materials have the desired macropore volume, and the inventive carbon material may be the one obtained through a treatment, such as crushing a commercial carbon material such that the commercial carbon material would have a macropore volume within the above range.

Examples of the carbon materials forming the core in the composite carbon material include soft carbons such as petroleum cokes, coal pitch cokes and polyvinyl chloride carbons; hard carbons such as carbon blacks, polyvinylidene chloride carbons, sugar carbons, cellulose carbons, phenolic resin carbons and charcoals; graphite-like materials obtained by heating the above soft carbons or hard carbons; powders of carbon fibers; and other carbon materials such as natural graphites and artificial graphites. The core-forming carbon material is preferably a graphite crystalline carbon, particularly a natural or artificial graphite, having a (002) interplanar distance, d002, in the range from 0.335 to 0.338 nm according to X-ray diffractometry.

In the invention, the core-forming carbon materials may be used singly, or two or more kinds may be used in combination.

Examples of the organic compounds for forming the coating carbon material in the composite carbon material include pitches such as petroleum-based pitches and coal-based pitches; thermoplastic resins such as polyvinyl chlorides, polyvinylidene chlorides, polyvinyl alcohols, polyethylenes, polyethylene terephthalates, polyvinylpyrrolidones, polyacrylonitriles, acrylonitrile styrene copolymers, acrylonitrile butadiene copolymers and styrene-ethylene.butylene-styrene block copolymers; and thermosetting resins such as phenolic resins, melamine resins and epoxy resins. The coating carbon materials are introduced by the carbonization of these organic compounds.

In the invention, the organic compounds for forming the coating carbon materials may be used singly, or two or more kinds may be used in combination.

Further, carbon blacks such as acetylene blacks, Ketjen blacks and furnace blacks; and carbon fibers such as polyacrylonitrile-based carbon fibers, pitch-based carbon fibers and vapor grown carbon fibers may be used as the coating carbon materials.

In the invention, the coating carbon materials may be used singly, or two or more kinds may be used in combination.

In order to enhance the desired effects, the coating carbon material in the invention preferably includes a carbon black, and particularly preferably includes a calcined mixture of a carbon black and a pitch or a calcined mixture of a carbon black and a thermoplastic resin. Acetylene black and Ketjen black are preferable as the carbon blacks. The pitches are not particularly limited, but those having a softening point of about 100° C. may be suitably used.

In the invention, the organic compound for forming the coating carbon material may be used in an appropriate amount in accordance with the macropore volume of the core-forming carbon material. The amount is preferably 5 to 150 mass %, more preferably 10 to 100 mass %, and particularly preferably 10 to 60 mass % relative to the core-forming carbon material. In the case where a carbon black is used as the coating carbon material, the amount thereof is preferably 0.5 to 100 mass %, more preferably 1 to 70 mass %, and particularly preferably 2 to 50 mass % relative to the core-forming carbon material.

The mixing ratio of a carbon black to a pitch, or of a carbon black to a thermoplastic resin (mass of a carbon black:mass of a pitch or a thermoplastic resin) is preferably 80:20 to 5:95, and particularly preferably 60:40 to 10:90. By producing the inventive carbon material according to such a configuration, the obtainable electrode active material achieves further improvements in the desired characteristics.

The inventive carbon material may include components containing elements other than carbon. For example, metal particles such as silicon and tin particles may be supported on the pore surface of the core-forming carbon material.

The electrode active material that includes the inventive carbon material obtained as described above allows an electrical storage device having the electrode active material to exhibit excellent low-temperature characteristics. By the use of the electrode active material of the present invention, the desired effects are obtained more markedly. Thus, the inventive electrode active material is suitably used as electrode active material for electrical storage devices utilizing the intercalation/deintercalation of lithium ions, and is particularly suitably used as a negative electrode active material for lithium ion capacitors or lithium ion secondary batteries.

Electrodes

An electrode of the invention contains the inventive electrode active material. Usually, the electrode has a collector and an active material layer on the collector which contains components such as the inventive electrode active material and a binder. The active material layer may be usually produced by applying a slurry containing components such as the electrode active material and a binder onto a collector, and drying the wet coating. The electrode of the invention is preferably a negative electrode utilizing the inventive electrode active material as a negative electrode active material, and is particularly preferably such a negative electrode for a lithium ion capacitor or a lithium ion secondary battery.

In the electrode of the invention, the electrode active materials may be used singly, or two or more kinds may be used in combination.

When the inventive electrode is a positive electrode, such a metal as aluminum or stainless steel is a preferred material for the collector. When the inventive electrode is a negative electrode, such a metal as copper, nickel or stainless steel is a preferred collector material. The thickness of the collectors is usually 10 to 50 µm for both positive and negative electrodes. In the case where the electrodes are to be used for lithium ion capacitors, the collectors of positive and negative electrodes preferably have throughholes extending between the front and the back surfaces, and the porosity of such collectors is preferably 30 to 70%. Examples of such collectors with throughholes include expanded metals, punched metals, and porous metal foils having etched throughholes.

Examples of the binders used for the inventive electrodes include rubber-based binders such as styrene-butadiene rubbers (SBR) and acrylonitrile-butadiene rubbers (NBR); fluoro-based resins such as polyethylene tetrafluoride and polyvinylidene fluoride; polypropylenes, polyethylenes, and fluorine-modified (meth)acrylic-based binders disclosed in JP-A-2009-246137. The amount of the binder is not particularly limited, but is preferably 1 to 20 mass %, and particularly preferably 2 to 10 mass % relative to the inventive electrode active material.

The binders may be used singly, or two or more kinds may be used in combination.

In the electrode of the invention, the active material layer may further contain additives, for example, conductive agents such as carbon blacks, graphites and metal powders; or thickening agents such as carboxymethyl cellulose, sodium salt thereof or ammonium salt thereof, methyl cellulose, hydroxymethyl cellulose, ethyl cellulose, hydroxypropyl cellulose, polyvinyl alcohols, oxidized starches, starch phosphates and casein.

The thickness of the active material layer containing the inventive electrode active material is not particularly limited, but is usually 5 to 500 preferably 10 to 200 and particularly preferably 10 to 100 µm. When the electrode is used for a lithium ion capacitor, the density of the active material layer containing the inventive electrode active material is preferably 0.50 to 1.50 g/cc, and particularly preferably 0.70 to 1.20 g/cc. When the electrode is used for a lithium ion secondary battery, the density of the active material layer containing the inventive electrode active material is preferably 1.50 to 2.00 g/cc, and particularly preferably 1.60 to 1.90 g/cc. These densities of the active material layer ensure a good balance between the retention of an electrolytic solution and the contact resistance between active materials. Thus, the electrical storage device achieves high capacity and low resistance.

Electrical Storage Devices

An electrical storage device of the invention has the inventive electrode as a negative electrode. Examples of the electrical storage devices include nonaqueous electrolyte secondary batteries, electric double layer capacitors and lithium ion capacitors. In the invention, the electrical storage devices are preferably lithium ion capacitors or lithium ion secondary batteries having the inventive electrode as a negative electrode.

The electrical storage device of the invention has at least a positive electrode and an electrolyte in addition to the inventive electrode used as a negative electrode. The configurations and the production of the inventive electrodes used as a negative electrode are as described above in "Electrodes".

In the electrical storage devices of the invention, the basic configurations and the production of the positive electrodes may be the same as described above in the section of "Electrodes" except that the active materials are different. When the electrical storage devices of the invention are lithium ion capacitors, examples of the positive electrode active materials include activated carbons and polyacene-based materials. When the electrical storage devices of the invention are lithium ion secondary batteries, examples of the positive electrode active materials include lithium transition metal complex oxides such as lithium cobalt oxides, lithium nickel oxides and lithium manganese oxides; transition metal oxides such as manganese dioxide; and carbonaceous materials such as graphite fluorides. These positive electrode active materials may be used singly, or two or more kinds may be used in combination.

In the electrical storage device of the invention, the electrolyte is usually used as an electrolytic solution in which electrolyte is dissolved in a solvent. The electrolyte in the invention is preferably one which can form lithium ions. Specific examples include $LiClO_4$, $LiAsF_6$, $LiBF_4$, $LiPF_6$, $LiN(C_2F_5SO_2)_2$, $LiN(CF_3SO_2)_2$ and $LiN(FSO_2)_2$. These electrolytes may be used singly, or two or more kinds may be used in combination.

The solvent for dissolving the electrolyte is preferably an aprotic organic solvent. Specific examples include ethylene carbonate, propylene carbonate, butylene carbonate, 1-fluoroethylene carbonate, 1-(trifluoromethyl)ethylene carbonate, dimethyl carbonate, diethyl carbonate, methyl ethyl carbonate, γ-butyrolactone, acetonitrile, dimethoxyethane, tetrahydrofuran, dioxolane, methylene chloride and sulfolane. These solvents may be used singly, or two or more kinds may be used in combination.

In order to reduce the internal resistance by the electrolytic solution, the concentration of the electrolyte in the electrolytic solution is preferably not less than 0.1 mol/L, and more preferably in the range from 0.5 to 1.5 mol/L. The electrolytic solution may contain additives such as vinylene carbonate, vinyl ethylene carbonate, succinic anhydride, maleic anhydride, propane sultone and diethyl sulfone.

Although the electrolyte may be usually used in a liquid form as described above, a gel or solid electrolyte may be used in order to prevent leakage.

When the electrolyte is used in the form of electrolytic solution, the positive and negative electrodes are usually separated from each other via a separator to prevent physical contact between the positive and negative electrodes. Examples of the separators include nonwoven fabrics and porous films made of materials such as cellulose rayons, polyethylenes, polypropylenes, polyamides, polyesters and polyimides.

Examples of the structures of the electrical storage devices include stacked cells in which three or more plate-shaped positive electrodes and negative electrodes each are stacked on top of one another via separators and a unit thus stacked is sealed in exterior films, and wound cells in which positive and negative electrode strips are wound via separators and a unit thus wound is housed in polygonal or cylindrical containers.

In the case where the inventive electrical storage device is a lithium ion capacitor, it is preferable that the negative electrode and/or the positive electrode be pre-doped with lithium ions such that the positive electrode potential becomes not more than 2.0 V (vs. $Li/Li^+$) after the positive and negative electrodes are short-circuited. Exemplary methods for lithium ion pre-doping are disclosed in, for example, WO 1998/033227 and WO 2000/007255.

EXAMPLES

The present invention will be described in detail based on examples hereinbelow without limiting the scope of the invention.

<Production of Carbon Materials A to C>

A commercial artificial graphite was crushed with a ball mill while changing the crushing time to give carbon materials A, B and C. The macropore volumes of the carbon materials A, B and C were 0.095 cc/g, 0.030 cc/g and 0.225 cc/g, respectively. The carbon materials A to C were used as core-forming carbon materials or as inventive carbon materials (active materials).

<Production of Composite Carbon Materials>

The carbon materials A to C were used as core-forming carbon materials. "Pitch D" with a softening point of 90° C. and/or acetylene black with a dibutylphthalate (DBP) oil absorption amount of 140 ml/g were used as a raw material compound of coating materials.

The core-forming carbon materials, Pitch D and acetylene black were mixed with each other according to the combinations and the amounts described in Table 1. The mixtures were sufficiently kneaded with a kneader. The kneaded products were calcined and carbonized at 1000° C. for 3 hours in a nitrogen atmosphere. The carbonized products were crushed with a ball mill and classified, thereby producing composite carbon materials.

Table 1 describes the macropore volumes of the composite carbon materials obtained and of the carbon materials A to C, as well as the 50% volume cumulative diameters D50 of the composite carbon materials. The macropore volume was determined by DH analysis with respect to a nitrogen adsorption isotherm obtained by a nitrogen adsorption method at 77 K with automatic specific surface area/pore size distribution analyzer BELSORP-mini II manufactured by BEL Japan, Inc. At this time, the measurement mode was "high-precision mode", and as a sample cell, a cell of about 1.8 $cm^3$, which is a standard cell, was used. The sample amount was weighed by using an electronic balance to a $10^{-4}$ g place so as to fall within the range of 0.1500 to 0.2500 g. The 50% volume cumulative diameter D50 was measured with laser diffraction/scattering particle size distribution analyzer LA-950 V2 manufactured by HORIBA Ltd.

<Production of Electrodes and Electrical Storage Devices>

(1) Fabrication of Negative Electrodes

A negative electrode collector was provided which was composed of expanded copper with a throughhole diameter of 28 μm, a porosity of 55% and a thickness of 25 μm (manufactured by NIPPON METAL INDUSTRY CO., LTD.). Both surfaces of the collector were coated with a slurry which contained the active material described in Table 1 and a SBR binder (TRD2001 manufactured by JSR Corporation), using a vertical die double-side coating machine under coating conditions where the coating width was 65 mm and the coating rate was 8 m/min to a target coating thickness (layer thickness) of the coatings on both sides combined of 45 μm. After the double-side coating, the coatings were dried at 200° C. for 24 hours under reduced pressure to form negative electrode active material layers as electrode layers on the front and the back surfaces of the negative electrode collector. In the formation of the negative electrode active material layers, the front and the back surfaces of the negative electrode collector were coated in such a manner that a section in which the electrode layers were formed on both sides of the collector (hereinafter, also referred to as "coated section" in the negative electrode sheet) and a section free from the electrode layers (hereinafter, also referred to as "uncoated section" in the negative electrode sheet) would be formed.

The obtained electrode sheet was then cut to a 65 mm×100 mm size in which the coated section was 65 mm×85 mm and the uncoated section was 65 mm×15 mm. Thus, a negative electrode sheet was fabricated in which the electrode layers were formed on both surfaces of the negative electrode collector.

(2) Fabrication of Positive Electrodes

An electrolytically etched aluminum foil (manufactured by TOYO ALUMINUM K.K.) was provided which had a pore diameter of 1 μm, a porosity of 11% and a thickness of 30 μm. Both surfaces of the foil were coated with a conductive coating material using a vertical die double-side coating machine under coating conditions where the coating width was 60 mm and the coating rate was 8 m/min to a target coating thickness of the coatings on both sides combined of 10 μm. After the double-side coating, the coatings were dried at 200° C. for 24 hours under reduced pressure to form conductive layers on the front and the back surfaces of the positive electrode collector.

The conductive layers on the front and the back surfaces of the positive electrode collector were then coated with a slurry which contained activated carbon particles having a number average particle diameter D50 of 3 μm and an acrylic-based binder, using a vertical die double-side coating machine under coating conditions where the coating rate was 8 m/min to a target coating thickness (layer thickness) of the coatings on both sides combined of 50 μm. After the double-side coating, the coatings were dried at 200° C. for 24 hours under reduced pressure to form positive electrode active material layers as electrode layers on the conductive layers. In the formation of the positive electrode active material layers, the front and the back surfaces of the positive electrode collector were coated in such a manner that a section in which the conductive layers and the electrode layers were formed on both sides of the collector (hereinafter, also referred to as "coated section" in the positive electrode sheet) and a section free from the conductive layers and the electrode layers (hereinafter, also referred to as "uncoated section" in the positive electrode sheet) would be formed.

The obtained electrode sheet was then cut to a 60 mm×95 mm size in which the coated section was 60 mm×80 mm and the uncoated section was 60 mm×15 mm. Thus, a positive electrode sheet was fabricated in which the electrode layers were formed on both surfaces of the positive electrode collector.

(3) Fabrication of Separators

Separators were fabricated by cutting a cellulose/rayon composite material film having a thickness of 35 μm and a gas permeability of 100 sec/100 ml, to a 67 mm×90 mm size.

(4) Fabrication of Lithium Ion Capacitor Elements

Ten positive electrode sheets obtained in (2), eleven negative electrode sheets obtained in (1), and twenty-two separators obtained in (3) were stacked on top of one another in the order of separator, negative electrode sheet, separator and positive electrode sheet. The four corners of the stack were fastened with a tape, thereby fabricating an electrode stack unit. In this fabrication of the electrode stack unit, the positive electrode sheets and the negative electrode sheets were stacked in such a manner that their respective coated sections would be opposed to each other via the separators and their respective uncoated sections would protrude from the separators on opposite sides to each other.

Next, a 100 μm thick lithium electrode was cut into a foil and was compression bonded to expanded copper with a thickness of 25 μm (manufactured by NIPPON METAL INDUSTRY CO., LTD.) to fabricate a lithium ion supply member. This lithium ion supply member was arranged on top of the electrode stack unit so as to be opposed to the negative electrode.

Power supply aluminum tabs for positive electrodes were provided which were 50 mm in width, 50 mm in length and 0.2 mm in thickness. In these power supply tabs, sealant films had been thermal fusion bonded to the sealing portions beforehand. The tabs were placed on and welded to the uncoated sections of the ten positive electrode sheets constituting the electrode stack unit. Separately, power supply copper tabs for negative electrodes were provided which were 50 mm in width, 50 mm in length and 0.2 mm in thickness. In these power supply tabs, sealant films had been thermal fusion bonded to the sealing portions beforehand. The tabs were placed on and welded to the uncoated sections of the eleven negative electrode sheets constituting the electrode stack unit, as well as to the lithium ion supply member. Thus, a lithium ion capacitor element was fabricated.

(5) Fabrication of Lithium Ion Capacitors

An exterior film 1 with a size 90 mm in length, 117 mm in width and 0.15 mm in thickness was provided which was a stacked film including a polypropylene layer, an aluminum layer and a nylon layer. In this exterior film 1, a central portion 70 mm in length and 97 mm in width had been squeezed. Further, an exterior film 2 with a size 90 mm in length, 117 mm in width and 0.15 mm in thickness was provided which was a stacked film including a polypropylene layer, an aluminum layer and a nylon layer.

Next, the lithium ion capacitor element was disposed at an accommodation section of the exterior film 2 such that the positive electrode terminals and the negative electrode terminals became protrudent outward from ends of the exterior film 2. The exterior film 1 was superposed on the lithium ion capacitor element, and outer peripheries on three sides (including the two sides from which the positive electrode terminals and the negative electrode terminals were protrudent) of the exterior films 1 and 2 were thermal fusion bonded with each other.

Separately, an electrolytic solution containing 1.2 mol/L of $LiPF_6$ was prepared using a mixed solvent which contained ethylene carbonate, propylene carbonate and diethyl carbonate (3:1:4 by volume). The electrolytic solution was poured through the open end of the exterior films 1 and 2. Thereafter, the exterior films 1 and 2 were completely thermal fusion bonded with each other.

In the above manner, a laminated exterior lithium ion capacitor cell sample (hereinafter, also referred to as "cell") was fabricated.

<Evaluation of Capacitance and Direct Current Internal Resistance>

The cell was charged at a current of 10 A in an environment at 25° C.±5° C. until the cell voltage reached 3.8 V, and thereafter the voltage was maintained for 30 minutes. Next, the cell was discharged at 10 A until the cell voltage became 2.2 V, when the capacitance (F) was measured. The direct current internal resistance (25° C. resistance) was evaluated by dividing the difference in voltage between immediately before discharging and after 100 msec after the initiation of discharging by the discharge current. The direct current internal resistance (−30° C. resistance) was similarly evaluated in an environment at −30° C.±5° C. The results are described in Table 1.

<Evaluation of Charge/Discharge Cycle Characteristics>

The cell was subjected to 100,000 cycles of constant current (CC) charging and discharging at 25° C. with a current density of 100 C between 3.8 V and 2.2 V. The discharge capacity retention (%) was calculated based on the discharge capacity after the 100,000 cycles relative to the initial discharge capacity. The results are described in Table 1.

TABLE 1

| | | Raw materials of active material | | | properties of active material | | Evaluation results | | | |
|---|---|---|---|---|---|---|---|---|---|---|
| | Cell No. | Core carbon material | Amount of Pitch D (mass %) | Amount of carbon black (mass %) | D50 of composite carbon material (μm) | Macropore volume (cc/g) | 25° C. Resistance (mΩ) | −30° C. Resistance (mΩ) | Capacitance (F) | Capacity retention (%) |
| Ex. 1 | S1 | A | — | — | — | 0.095 | 5.11 | 138 | 331 | 96 |
| Comp. Ex. 1 | C1 | B | — | — | — | 0.030 | 5.78 | 189 | 332 | 97 |
| Ex. 2 | S2 | C | — | — | — | 0.225 | 4.72 | 127 | 330 | 95 |
| Ex. 3 | S3 | A | 30 | 0 | 5 | 0.063 | 5.21 | 142 | 329 | 97 |
| Ex. 4 | S4 | A | 50 | 0 | 5 | 0.051 | 5.40 | 148 | 328 | 98 |
| Comp. Ex. 2 | C2 | A | 70 | 0 | 5 | 0.030 | 5.61 | 175 | 328 | 96 |
| Comp. Ex. 3 | C3 | A | 100 | 0 | 5 | 0.015 | 6.03 | 210 | 326 | 96 |
| Ex. 5 | S5 | A | 30 | 5 | 5 | 0.083 | 4.91 | 132 | 329 | 98 |
| Ex. 6 | S6 | A | 30 | 15 | 5 | 0.190 | 4.72 | 121 | 328 | 96 |
| Ex. 7 | S7 | A | 30 | 30 | 5 | 0.165 | 4.60 | 125 | 327 | 96 |
| Comp. Ex. 4 | C4 | B | 30 | 0 | 5 | 0.020 | 5.82 | 200 | 331 | 98 |
| Comp. Ex. 5 | C5 | B | 30 | 5 | 5 | 0.042 | 5.51 | 165 | 329 | 97 |
| Ex. 8 | S8 | B | 30 | 30 | 5 | 0.130 | 4.73 | 128 | 329 | 96 |
| Ex. 9 | S9 | C | 30 | 0 | 5 | 0.150 | 4.59 | 123 | 328 | 97 |
| Ex. 10 | S10 | C | 30 | 50 | 5 | 0.270 | 4.42 | 110 | 327 | 95 |
| Ex. 11 | S11 | C | 30 | 100 | 5 | 0.330 | 4.21 | 100 | 326 | 91 |
| Comp. Ex. 6 | C6 | C | 30 | 300 | 5 | 0.420 | 4.11 | 90 | 323 | 86 |
| Ex. 12 | S12 | A | 30 | 5 | 1.0 | 0.350 | 4.22 | 95 | 327 | 93 |
| Ex. 13 | S13 | A | 30 | 5 | 3 | 0.143 | 4.88 | 126 | 328 | 96 |
| Comp. Ex. 7 | C7 | A | 30 | 5 | 0.7 | 0.560 | 4.01 | 85 | 326 | 89 |
| Ex. 14 | S14 | A | 30 | 10 | 10 | 0.051 | 5.40 | 148 | 329 | 96 |
| Comp. Ex. 8 | C8 | A | 30 | 10 | 15 | 0.032 | 5.72 | 170 | 329 | 96 |

In Table 1, the amounts of Pitch D and carbon black are indicated in terms of mass % relative to the core-forming carbon material.

With respect to the cells in which the negative electrodes utilized a composite carbon material with a 50% volume cumulative diameter D50 of 5 μm, Table 1 illustrates that the cells (S3 to S11) utilizing a composite carbon material with a large macropore volume exhibited lower direct current internal resistance at −30° C. compared to the cells (C2 to C5) utilizing a composite carbon material with a macropore volume of less than 0.05 cc/g, irrespective of the types of the core-forming carbon materials. In particular, the cells (S6 to S11) which utilized a composite carbon material with a macropore volume exceeding 0.10 cc/g achieved as low a direct current internal resistance at −30° C. as below 130 mΩ. On the other hand, an increase in direct current internal resistance occurred in the cells (C2 and C3) which utilized a composite carbon material whose macropore volume had been decreased to less than 0.05 cc/g as a result of coating with the pitch. This result will suggest that the amount of the pitch was excessively large. The cell (C6) which utilized a composite carbon material with a macropore volume exceeding 0.4 cc/g exhibited low direct current internal resistance, but were shown to be unsatisfactory because the discharge capacity retention after 100,000 cycles was below 90%.

The cell (S12) utilized a composite carbon material with a 50% volume cumulative diameter D50 of 1.0 μm. The macropore volume of the composite carbon material was as large as 0.35 cc/g, and the cell exhibited low resistance. However, the cell exhibited relatively low retention (93%) of discharge capacity after 100,000 cycles. Thus, it can be said that the 50% volume cumulative diameter D50 is preferably not less than 1.0 μm.

In the cells (S1 and S2), the negative electrodes contained the carbon material A or C that was not covered with any coating carbon material and had large macropore volume. These cells exhibited low direct current internal resistance and high retention of discharge capacity after 100,000 cycles. However, gas was generated during pre-doping with lithium ions. Thus, the composite carbon material obtained by using a material such as pitch is desirable. The cell (C1) that utilized the core carbon material B with a small macropore volume in the negative electrodes exhibited high direct current internal resistance. Thus, it is desirable that the macropore volume be increased by mixing carbon black.

While this example involved acetylene black as the carbon black and Pitch D with a softening point of 90° C. as the pitch, any other organic compounds may be used for coating without problems provided that the macropore volume of the composite carbon material is 0.05 to 0.40 cc/g. While this example illustrates lithium ion capacitors utilizing activated carbon in the positive electrodes, the present inventors have confirmed that lithium ion secondary batteries utilizing lithium cobaltate in the positive electrodes similarly achieve a decrease in direct current internal resistance at low temperatures by the use of the negative electrode including the inventive carbon material having a macropore volume of 0.05 to 0.40 cc/g.

The invention claimed is:

1. An electrode active material comprising a carbon material, wherein a volume of micropores having a pore diameter of 50 to 400 nm in the carbon material is 0.05 to 0.40 cc/g as measured by a nitrogen absorption method.

2. The electrode active material according to claim 1, wherein the carbon material is a composite carbon material that contains a carbon material forming a core, and a coating carbon material covering at least part of the core-forming carbon material.

3. The electrode active material according to claim 2, wherein the coating carbon material comprises a carbon black.

4. The electrode active material according to claim 1, wherein the carbon material has a 50% volume cumulative diameter D50 of 1.0 to 10.0 μm.

5. An electrode comprising the electrode active material according to claim 1.

6. An electrical storage device comprising the electrode according to claim 5 as a negative electrode.

7. A lithium ion capacitor comprising the electrode according to claim 5 as a negative electrode.

8. A lithium ion secondary battery comprising the electrode according to claim 5 as a negative electrode.

9. The electrode active material according to claim 1, wherein the carbon material has a 50% volume cumulative diameter D50 of 1.0 to 5.0 μm.

10. The electrode active material according to claim 2, wherein the coating carbon material comprises a calcined mixture of a carbon black and a pitch or a calcined mixture of a carbon black and a thermoplastic resin.

* * * * *